(12) United States Patent
Liao

(10) Patent No.: US 7,713,028 B2
(45) Date of Patent: May 11, 2010

(54) TURBINE BLADE ASSEMBLY

(76) Inventor: Ning Liao, 74 Stanford Rd. East, Pennington, NJ (US) 08534

( * ) Notice: Subject to any disclaimer, the term of this patent is extended or adjusted under 35 U.S.C. 154(b) by 641 days.

(21) Appl. No.: 11/604,112

(22) Filed: Nov. 27, 2006

(65) Prior Publication Data
US 2008/0124216 A1 May 29, 2008

(51) Int. Cl.
F03D 11/00 (2006.01)
(52) U.S. Cl. ...................................... 416/194
(58) Field of Classification Search ............ 416/196 A, 416/194, 195, 155, 159, 162, 158, DIG. 4, 416/DIG. 6, 248; 415/4.3, 4.5, 4.1, 905, 415/908
See application file for complete search history.

(56) References Cited

U.S. PATENT DOCUMENTS

| 109,673 | A | * | 11/1870 | Salter | 416/194 |
| 440,266 | A | | 11/1890 | Meredith | |
| 766,219 | A | | 8/1904 | Clemson | |
| 1,030,900 | A | * | 7/1912 | Liston | 416/194 |
| 1,532,601 | A | * | 4/1925 | Regener | 416/194 |
| 1,790,175 | A | | 1/1931 | Spencer | |
| 2,103,910 | A | | 1/1937 | Lung | |
| 2,516,576 | A | | 7/1950 | Jacobs | |
| 4,297,076 | A | | 10/1981 | Donham et al. | |
| 4,316,699 | A | * | 2/1982 | Schott et al. | 416/139 |
| 4,348,154 | A | * | 9/1982 | Ducker | 416/43 |
| 4,403,916 | A | | 9/1983 | Skelskey | |
| 4,729,716 | A | | 3/1988 | Schmidt | |
| 4,952,119 | A | * | 8/1990 | Widseth | 416/33 |
| 6,155,785 | A | | 12/2000 | Rechnagel et al. | |
| 6,320,273 | B1 | | 11/2001 | Nemec | |
| 7,071,578 | B1 | * | 7/2006 | Shibata et al. | 416/1 |

* cited by examiner

Primary Examiner—Richard Edgar
(74) Attorney, Agent, or Firm—Thomas L. Adams

(57) ABSTRACT

A turbine blade assembly has a plurality of blades mounted on a central rotor. Each of the blades has a proximal section and a variable pitch section. A number of stays extend in groups from the central rotor to converge and terminate on an associated one of the blades. The stays each have a proximal end spaced from the blades.

26 Claims, 5 Drawing Sheets

TURBINE BLADE ASSEMBLY

BACKGROUND OF THE INVENTION

1. Field of the Invention

The present invention relates to turbine blade assemblies, and in particular, to assemblies reinforced with stays.

2. Description of Related Art

Independence from foreign energy sources is highly desirable. In particular, reliance on foreign crude oil as an energy source has tended to cause economic hardship and instability because the price of crude oil can vary dramatically based on a number of unpredictable geopolitical and economic factors.

In some regions wind power is a viable domestic energy source. Known wind-driven turbines employ rather long turbine blades that rotate an electrical generator. The entire wind turbine can be mounted on a high tower to provide clearance for large blades and to expose the blades to more dependable winds existing at a higher elevations.

In any event, the economic viability of the wind turbine depends greatly on the capital cost in comparison to the energy generated, which in turn depends greatly on the turbine's ability to capture the largest amount of energy.

For a given wind velocity, the power delivered by a turbine varies as the square of the diameter, i.e., doubling the diameter swept by the blades quadruples the energy captured. Consequently, designers have attempted to employ longer blades in order to increase the power output. For this reason, turbine designers have proposed blades that are a hundred feet in length.

The current designs of large horizontal wind turbines mostly utilize a three-blade configuration. To withstand strong gust of winds in extreme weather, the blades have to be made extremely strong. This directly increases the weight of the blades, resulting in heavier total head mass for the turbine systems, which translates into higher turbine system costs. Generally, as the diameters of the turbines increase, the blade weights increase exponentially. According to a paper by the National Renewable Energy Laboratory in 2001, the blade weight increase is proportional to the 2.4 power of the blade length with blades having a length of between 20 and 40 meters. Hence finding designs that effectively control the weight increase is critical for large wind turbines.

Blade tip speed is one of the major constraints that limit the size of the current three-blade wind turbine. At a typical fixed operating wind speed, if the diameter of a wind turbine increases, the tip speed ratio of the turbine blade will increase accordingly (Tip speed ratio=Tip speed/Working wind speed). The increase of tip speed ratio will result in the decease of turbine efficiency. To reduce the tip speed ratio, then it is necessary to increase the number of blades of the turbine in order to lower the operating rpm of the turbine. However, increasing the number of blades will increase the massiveness of the turbine and the turbine weight, so that attempts to increase the number of blades is difficult with today's design. The solution to this hurdle is again a new design that can slim down the size of the blades and reduce the blade weight.

Current designs of large wind turbine blades emphasize the use of composite materials in order to meet the requirement of blade strength. Composite materials are relatively new and are not that well understood compared with the traditional material like metals. Also, the composite materials usually require special manufacturing processes that are more costly.

In the past, attempts had been made to utilize cables to reinforce the turbine blades. But these known designs attach the cables to the blades in a rudimentary way (e.g., U.S. Pat. No. 4,403,916), resulting in blades which cannot be rotated around their axes to adjust pitch. So pitch controllers cannot be used in such designs. Such pitch control can be helpful in today's large modern wind turbines for maintaining a fixed rotating speed in the variable operating wind speed environment.

See also U.S. Pat. Nos. 440,266; 766,219; 1,790,175; 2,103,910; 2,516,576; 4,297,076; 4,403,916; 4,729,716; 6,155,785; and 6,320,273.

SUMMARY OF THE INVENTION

In accordance with the illustrative embodiments demonstrating features and advantages of the present invention, there is provided a turbine blade assembly including a central rotor having a central axis. Also included is a plurality of blades mounted on the rotor. Each of the blades has a proximal section and a variable pitch section. The variable pitch section is adjustable to a pitch that may differ from that of the proximal section. The turbine blade assembly also has a plurality of stays each extending from the central rotor to approach and terminate on an associated one of the blades.

In accordance with another aspect of the invention a turbine blade assembly is provided with a central rotor having a central axis. The turbine blade assembly includes a plurality of blades mounted on the rotor. Also included is a plurality of stays each having a proximal end spaced from the blades and a distal end attached to an associated one of the blades. Each of the blades connects to the distal ends of a different associated pair of the stays.

By employing apparatus of the foregoing type, an improved wind turbine is achieved. In one disclosed embodiment each blade has a proximal section and a variable pitch section. The variable pitch section can rotate about its axis in order to change the blade's effective pitch angle. A pitch controller in the form of a motor can rotate the variable pitch section of the blade. In some embodiments the proximal section of the blade will also be rotatable about its blade axis but may have only two discrete positions: a normal operating position and a parked position when the turbine is offline.

The disclosed new design uses stays in the form of cables, rods or guy wires to reinforce the wind turbine blades. Thus the blades by themselves can be made of a less sturdy material or design.

A dished auxiliary wheel located behind the blades of the wind turbine is centered on the main shaft of the turbine. Also, a coaxial pylon extends in front of the turbine blades. This wheel and pylon are used as the terminal supports for the proximal ends of a number of stays whose distal ends extend to and reinforce the turbine blades. In particular, forward stays extend from the tip of the pylon to remote brackets, one on each blade. Also, a pair of stays extend tangentially from the rim of the dished wheel to these remote brackets.

This bracket has a generally tetrahedral shape with a trio of legs diverging from the blade and attaching to a base in the form of a triangular arrangement of rungs. The distal ends of the three stays terminate at the vertices of the bracket base. The bracket is located on the proximal blade section, just inboard of the variable pitch section.

Accordingly, turbine designs in accordance with the foregoing principles will be able to reduce the overall turbine weight, and hence reduce the cost of turbines. Moreover, such designs achieve larger diameters and turbines with a larger number of blades. Also, such turbines can be built with less expensive materials or processes.

BRIEF DESCRIPTION OF THE DRAWINGS

The above brief description as well as other objects, features and advantages of the present invention will be more fully appreciated by reference to the following detailed description of presently preferred but nonetheless illustrative embodiments in accordance with the present invention when taken in conjunction with the accompanying drawings, wherein.

DETAILED DESCRIPTION OF THE PREFERRED EMBODIMENTS

Figure 1:
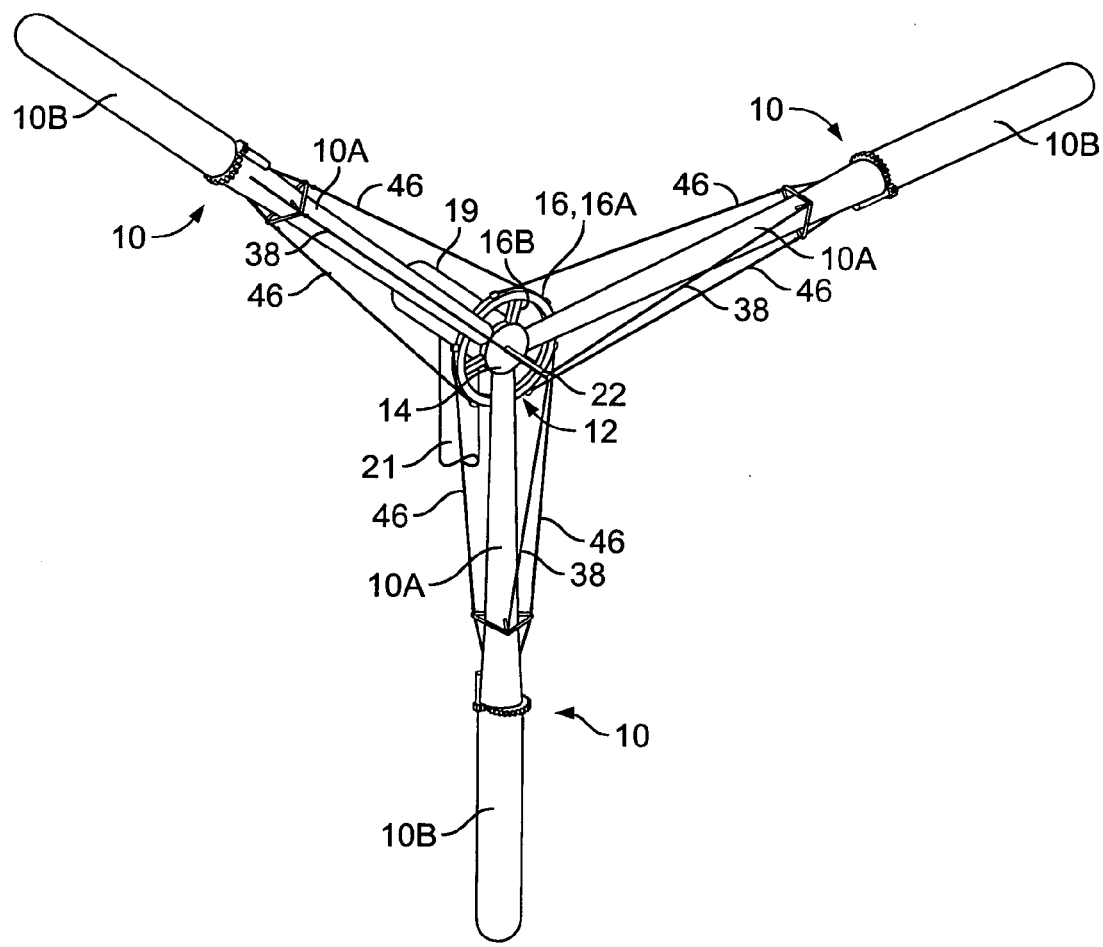
FIG. 1 is a perspective view of the turbine blade assembly in accordance with principles of the present invention.
Figure 2:
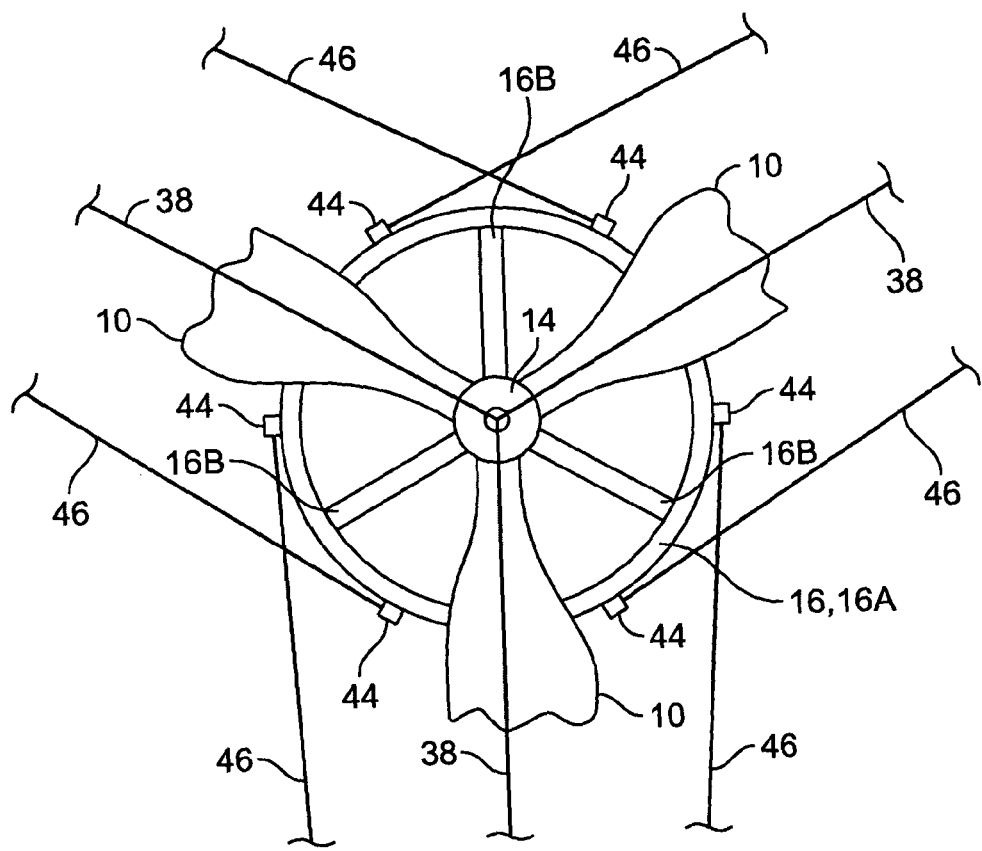
FIG. 2 is a detailed, fragmentary, front elevational view of the turbine blade assembly of FIG. 1.
Figure 3:
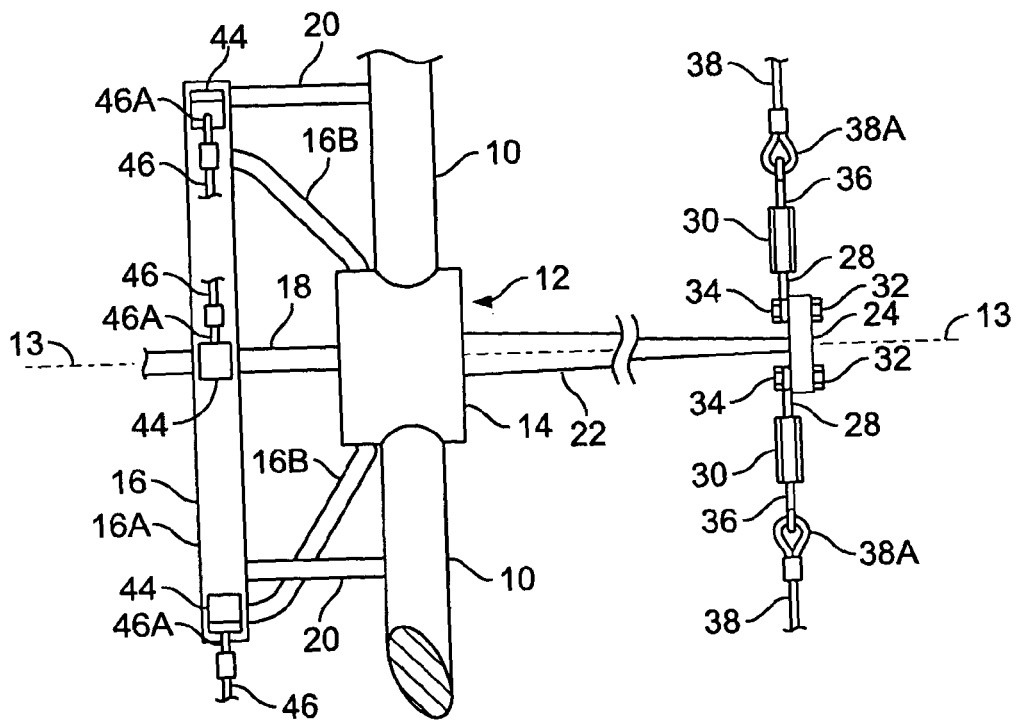
FIG. 3 is a side view of the apparatus of FIG. 2.

Referring to FIGS. 1-3, a turbine blade assembly is shown as a trio of equiangularly spaced blades 10 extending radially outward from a central rotor 12. Rotor 12 is shown with a hub 14 supporting the roots of blades 10.

Figure 7:
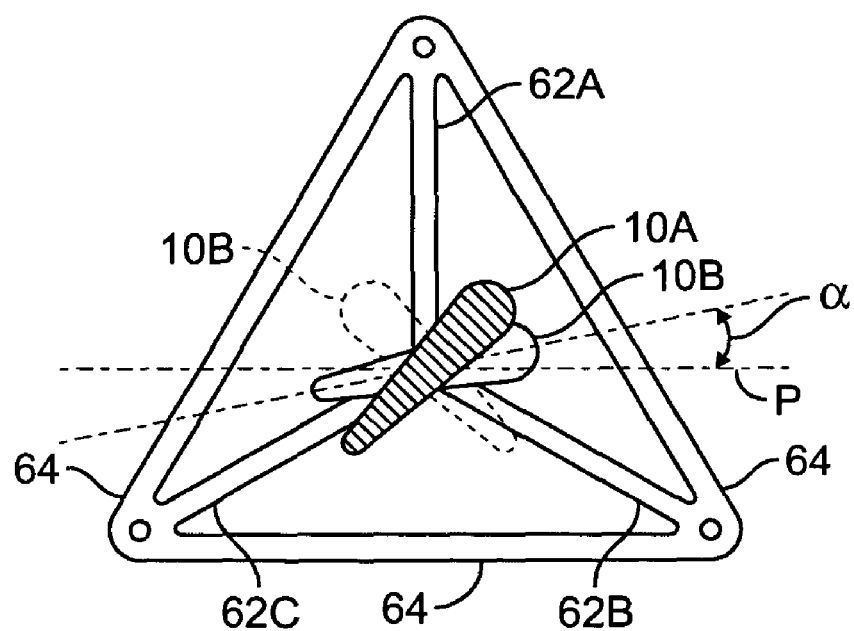
FIG. 7 is the view taken along lines 7-7 of FIG. 6.
Figure 8:
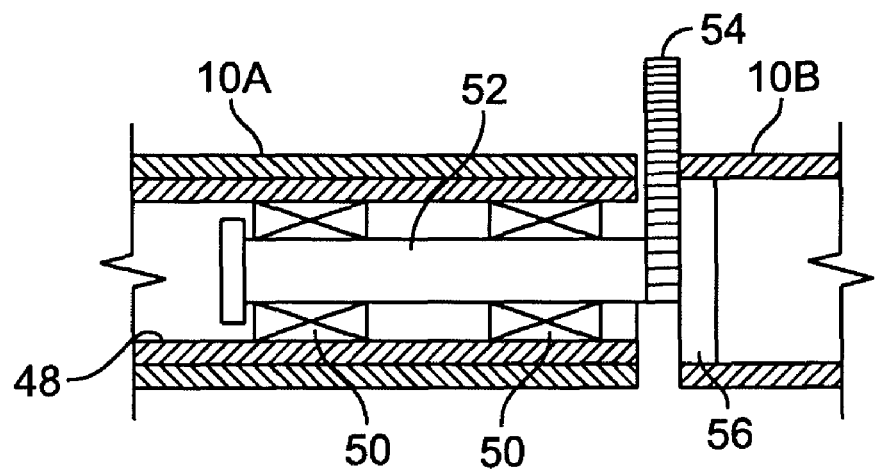
FIG. 8 is a sectional view taken along the axis of one of the blades of FIG. 1 at the joint between the proximal section and the variable pitch section of the blade.

Blades 10 each have a proximal section 10A and a variable pitch section 10B. Blades 10B are shown in an operating position with a moderate pitch angle (for example, an angle in the range of 10 to 30°). In some embodiments blades 10B can rotate from the illustrated pitch to a pitch of 90° where the blades produce no power (i.e., a parked position) or a reverse pitch to counterbalance any torque that may be produced by the proximal section 10A. FIG. 7 indicates the pitch angle is measured with respect to the plane of blade rotation P.

Hub 14 is a central element of a dished wheel 16 having a rim 16A connected by three curved spokes 16B to hub 14. Three braces 20 extend axially from the rim 16A to blades 10 to reinforce them. A coaxial drive shaft 18 connects hub 14 to a gearbox (not shown), then to an electrical generator 19 (FIG. 1) supported on tower 21.

Coaxial pylon 22 extends axially from the front of hub 14 and terminates at its distal end with a disk 24. Pylon 22 and wheel 16 with its central hub 14 are considered part of the central rotor 12, which rotates about its central axis 13.

Much like the tower on a suspension bridge, pylon 22 can provide support for forward stays 38 and can provide a place to joint all of them together. It is also an ideal place to place other devices, such as a device to adjust the tension of the forward stays 38.

Figure 4:
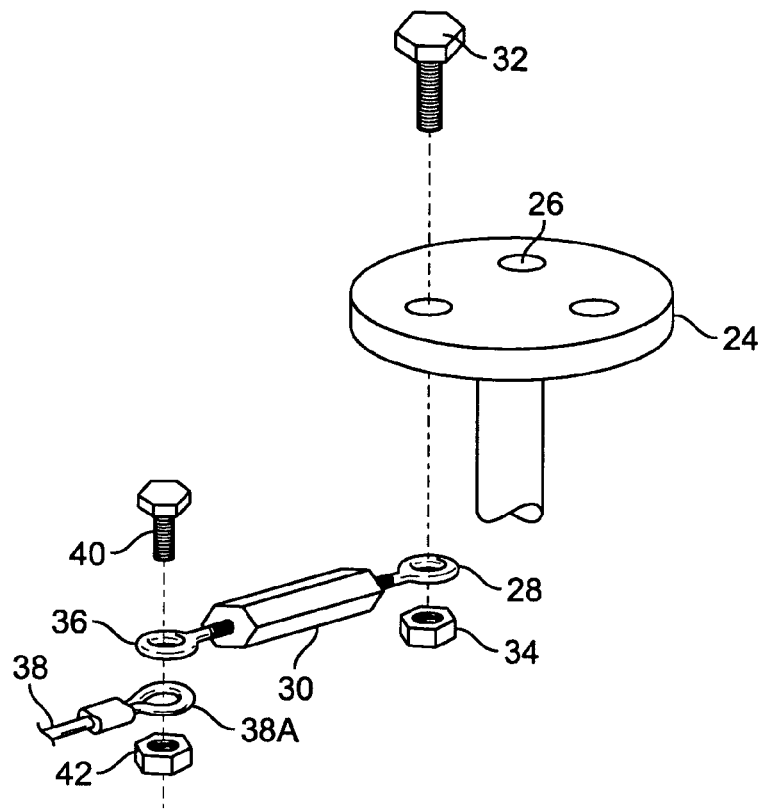
FIG. 4 is a detailed, exploded, perspective view of a portion of the structure at the tip of the pylon of FIG. 3.
Figure 5:
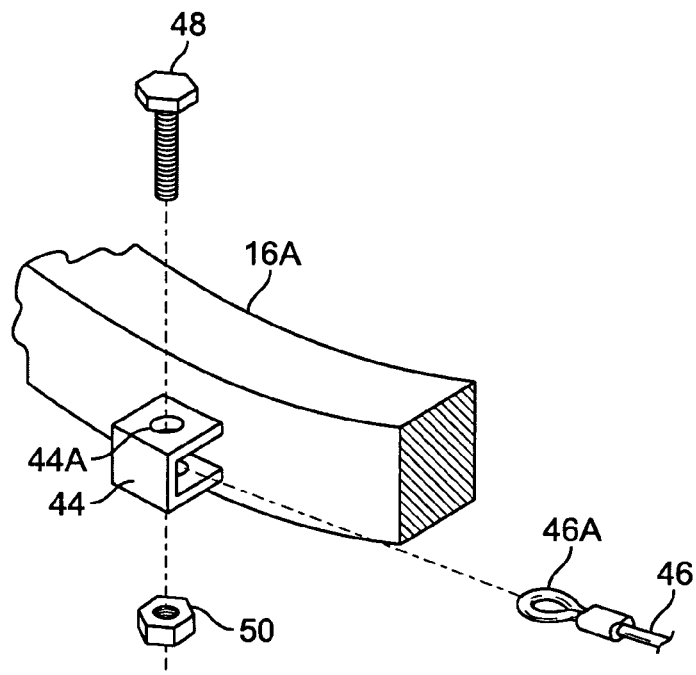
FIG. 5 is a detailed, exploded, perspective view of a portion of the dished wheel of FIG. 3.

As shown in FIG. 4, disk 24 has three equiangularly spaced boltholes 26. The proximal eye 28 of turnbuckle 30 can be bolted to the bolthole 26 using bolt 32 and nut 34. The distal eye 36 of turnbuckle 30 can be bolted to the loop 38A at the illustrated proximal end of stay 38 using bolt 40 and nut 42. Turnbuckle 30 can be rotated to adjust the tension in stays 38.

Each stay 38 is a twisted-strand cable, although simple guy wires or other types of elongated elements. Stay 38 is positioned in front of blades 10.

Referring to FIGS. 1-3 and 5, six terminals 44 with boltholes 44A are mounted on the circumference of rim 16A. Loop 46A on the proximal end of stay 46 can be inserted into the arch of terminal 44 and bolted in place using bolt 48 and nut 50. FIG. 2 shows that a pair of stays 46 is associated with each of the blades 10 and extends tangentially from wheel 16 at approximately diametrically opposite positions. This pair of stays 46 together with a forward one of the stays 38 make up a trio of stays (or a corresponding group of stays) for each blade 10. (In this specification an associated pair from the trio may be defined as any two of the trio, including a pairing where one of the stays 46 is paired with one of the stays 38.) Stays 46 may be cables similar to previously mentioned stays 38. In some embodiments stays 38 and 46 can be replaced completely or partially by rigid rods.

Referring to FIGS. 1 and 6-8, proximal blade section 10A has an outer shell made of fiberglass (or sheet metal, or carbon fiber composite, etc.) encircling a core 48 in the form of a square steel (fiber composite, or aluminum) tube. Blade section 10B may be made of the same material as the outer shell of blade section 10A, but need not necessarily have a core. It will be appreciated that the materials used to construct the blade sections 10A and 10B may differ.

Internally mounted at the distal end of square tube 48 are a pair of bearings 50 for rotatably supporting stub shaft 52, whose distal end is attached to semicircular gear 54, which is in turn attached to the end plate 56 mounted inside the proximal end of blade section 10B. Accordingly, blade section 10B can rotate relative to blade section 10A, as shown in FIG. 7.

Gear 54 engages spur gear 60, which is driven by motor 58 mounted on blade section 10A. Motor 58 is shown controlled by pitch controller 70, which is part of a feedback loop arranged so that controller 70 can execute a position command wherein motor 58 will feed back a signal indicating the actual position of the blade 10B (either by measuring the position of spur gear 64 or the semicircular gear 54). The position command executed by controller 70 is regulated by its inputs 72. Inputs 72 can include (a) a wind speed/directional signal derived from a local anemometer/wind vane (not shown); (b) a turbine speed signal derived from a speedometer (not shown) attached to shaft 18 (FIG. 3); (c) the measured electrical load on generator 19 (FIG. 1); (d) vibration sensors (not shown) mounted on the tower 21; and (e) the pitch position sensors mounted on blade segment 10B, etc. (and their combinations).

Extending transversely from blade section 10A are three equiangularly spaced struts 62A, 62B, and 62C. The distal ends of these struts are connected together by rungs 64 forming an isosceles triangle. Attached to the vertices of the rungs 64 are a trio of converging legs 68 that attach to blade section 10A near its junction with blade section 10B. Legs 68 and rungs 64 are arranged much like a tetrahedron. Mounted at the vertices of rungs 64 are receptacles in the form of threaded eyes 66. Stays 38 and 46 are shown attached by loops at their distal ends to the eyes 66. Tension on the stays 38 and 46 can be increased/decreased by tightening/loosening nuts (not shown) on the eyes 66 to move them relative to the vertices of rungs 64.

Referring to FIG. 7, when the turbine is in a parked condition, the tip section 10B will be turned to the angle shown in phantom, that is, an angle that is slightly opposed to the angle of the root section 10A in order to cancel the torque of the root section 10A. In some embodiments however, blade sections 10A and 10B may both be rotated to a head into the wind so that no torque is produced. Alternatively, proximal blade section 10A can be rotated to produce a reverse pitch that cancels the torque produced by blade section 10B.

For normal operations however, tip section 10B will be in a position that reinforces the torque of proximal section 10A; for example, the position for blade section 10B shown in full in FIG. 7.

To facilitate an understanding of the principles associated with the foregoing apparatus, its operation will be briefly described. It will be presumed that the pitch of blade section 10A is fixed and that initially, variable pitch section 10B is in the position shown in phantom in FIG. 7. Accordingly, the torques produced by sections 10A and 10B will substantially cancel and the wind turbine will not rotate (parked). Alternatively, the turbine can be rotated azimuthally (in yaw) to a position athwart the wind so that blades 10 produce no net torque. It will be appreciated however, that under normal circumstances the turbine will be axially aligned in a conventional manner to face into the wind.

To start the turbine, the system may initially release a turbine brake (not shown) and operate motor 58 to adjust the pitch of blade section 10B until it reaches some starting pitch. Specifically, an operator will apply a signal to controller 70 (FIG. 6) to command motor 58 to rotate spur gear 60 and semicircular gear 54 in order to drive variable pitch section 10B to the position shown in full in FIG. 7. Consequently, the torques produced by blade sections 10A and 10B will reinforce each other and the wind turbine will begin to rotate. The cross sections of blade sections 10A and 10B may have an airfoil contour much like an airplane wing, or other contours that may be commonly used for wind turbines. Consequently, the torque produced by blades 10 will be produced in part by the lift provided by the blades.

In this embodiment a conventional induction generator is employed without a frequency converter. Controller 70 can regulate the pitch of blade 10B to seek target values. At the turbine startup, the pitch of blade sections 10B is set to the optimum angle determined by the working wind speed at that time. During normal operations after the generator 19 had been successfully connected to the power grid, the pitch of blade sections 10B are controlled by closed loop controller 70 to regulate output power from generator 19. Below the rated wind speed, the pitch of blade sections 10B is set at an optimum angle to give maximum power. Above the rated wind speed the pitch can be adjusted away from optimum by either pitching towards feather or pitching towards stall (that is, operating with a pitch that is lower than optimum or higher than optimum; see FIG. 7, in which the pitch angle=0 degrees is defined as blade 10B generating no lift and minimum resistance on the rotation plane).

Controller 70 may provide proportional and integral (PI) control while in some embodiments a differential term may be added (PID control). The design considerations for controller 70 are described in various references including Chapter 8 of Wind Energy Handbook by Burton, Sharpe, Jenkins, and Bossanyi (John Wiley & Sons Ltd.; 2001)(ISBN: 0471 489972), which is incorporated herein by reference.

Figure 6:
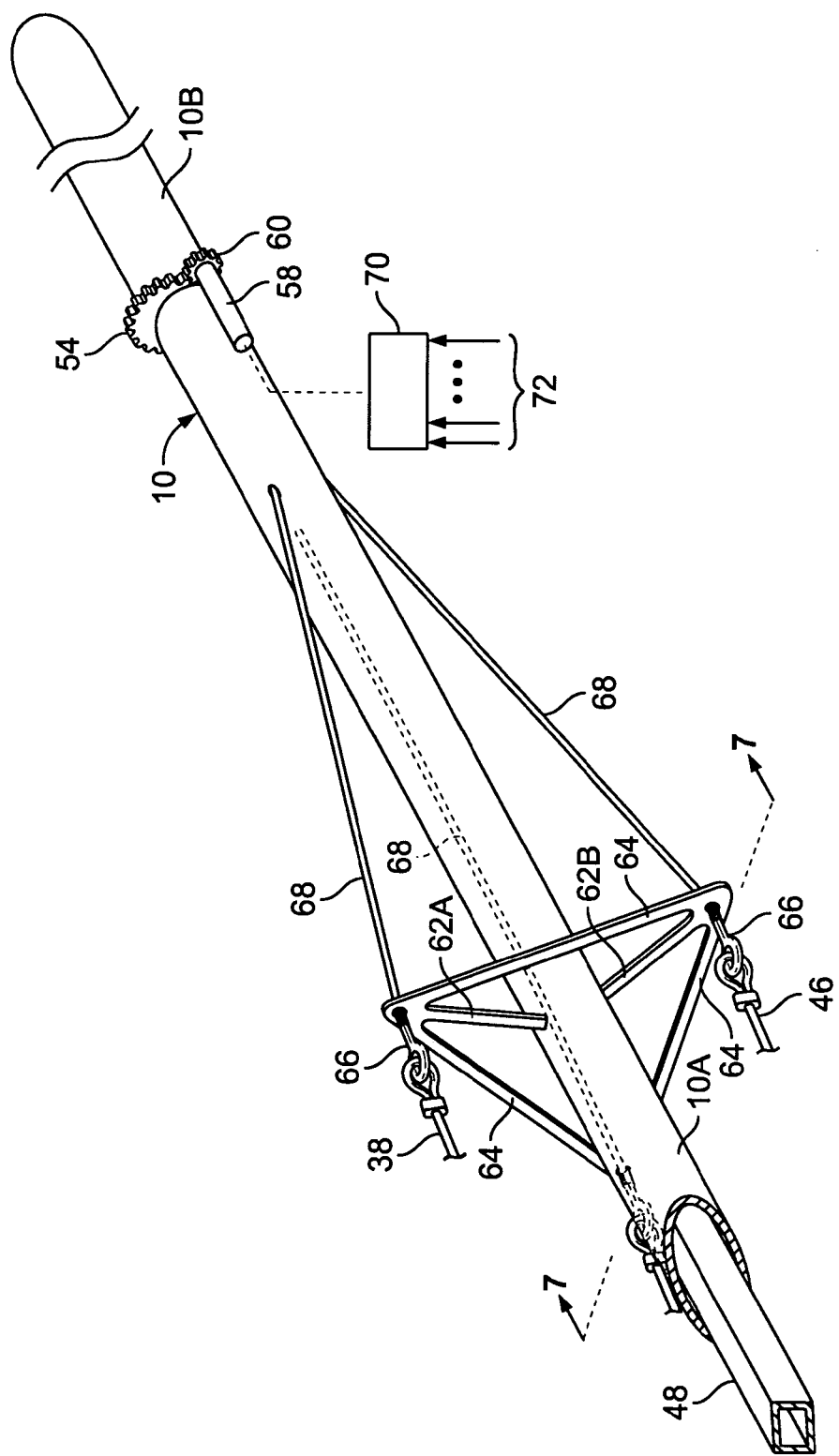
FIG. 6 is a detailed, fragmentary, perspective view of one of the blades of FIG. 1.

Controller 70 can be a PI controller of PID controller; it can be type of analog or digital. In the case of digital type embodiment, controller 70 will have an algorithm that correlates the power level input signals from generator 19, local wind speed and direction signals from local anemometer, position signal from blade sensor and other signal sources, to the commands driving the motor 58 (FIG. 6). The employed algorithm may also have the capability to record the operation history and use it to make prediction for future pitch positions.

By utilizing sectioned blades, the proximal section 10A together with the cable stays 38 and 46 form a stable framework that serves as the base for the variable pitch section 10B. The proximal blade section 10A is mounted at a fixed pitch pre-determined by the environment in which the turbine is to operate, with consideration given to the operating wind speed and the stall regulation capability of the blade sections 10A, 10B to regulate the turbine like the traditional pitch control component. Per unit length, the tip section 10B sweeps more area than the proximal section 10A; thus, the tip section 10B tends to collects the most energy for the turbine blade. This makes it sufficient to use just the tip section 10B of the wind turbine to regulate the rotation speed of the turbine under the control of a modified pitch controller.

While controller 70 may use much of the control schemes that are commercially prevalent and well-known, some special accommodations may be appropriate. The controller 70 will typically have tailored characteristics that differ somewhat traditional pitch controllers, mainly due to the fact that only the tip section 10B of the blade is under its control, yet the whole turbine's speed is to be regulated by the controller 70.

The root section 10A of the blades 10 may utilize a stall control method for speed regulation at a fixed pitch. The other function of the controller 70 is to use the tip section's torque to cancel the root section's torque when the turbine is on a parked position.

The tetrahedral design of FIG. 6 (legs 68, rungs 64, and struts 62A, 62B and 62C) avoids one of the weaknesses of a slim blade, namely the tendency of a blade to twist around its axis when under load as a consequence of its reduced cross section. The foregoing tetrahedral mount extend outwardly and effectively enlarges the blade's effective cross section. When the legs 68 are connected to the stays 38 and 46, the tension in the stays will then provide an anti-twisting force for the blades 10.

The drag and lift forces of blade section 10A will be counterbalanced by stays 38 and 46. Both the drag and the lift forces tend to push blade sections 10A back so that normally the highest tensile loads are sustained by forwards stays 38. The tensile load on stay 38 is however reduced because of the forward placement of their proximal ends on the tip of pylon 22. The tensile loads caused by the lift and drag forces on stays 46 are less but still significant. Regardless, the tensile loads on stays 46 are reduced because of the lateral placement of their proximal ends on the rim 16A of wheel 16.

In general, forward cable 38 and dual cables 46 act as guy wires to hold the blades 10 firmly in place during turbine operations, and to provide greater ability to withstand destructive forces in violent turbulence during bad weather. As previously noted, the forward cable 38 is designed to bear the major pressure load of the blade span, and hence limit the blade's out-of-plane deflection during the normal operations in which the turbine is facing the wind.

Stay 46 transfers the captured energy in the form of torque from the blades to the turbine axis 18 through the auxiliary wheel 16; and reduces the in-plane-deflection of blade 10 caused by gravity during the blade rotation. Accordingly, an important function of the auxiliary wheel 16 is to provide a wider base of connection for the stays 46. Hence the blade 10 can have a better overall support. Wheel 16 also provides support for the pylon 22 that extends out from the main shaft 18 among the spokes 16B.

As previously noted, an advantage of the tetrahedral structure of FIG. 6 is that the stays 38 and 46 are effectively attached at a radially distant location, which tends to prevent twisting of the blade section 10A that might occur should the stays be somewhat off-center or unbalanced in turbulence.

In some embodiments this tetrahedral structure can be eliminated and can be replaced with a collar that is mounted to freewheel about the axis of the proximal blade section 10A. If the stays are connected to this freewheeling collar the stays cannot produce any twisting moments on the proximal blade section 10A.

A bearing designed to allow freewheeling rotation of such a collar will need to take into account the fact that the forward stay 38 applies a substantial force at an angle to the blade axis. For this reason, a composite bearing may be employed with two distinct roller bearings. One roller bearing is mounted on the inside of the collar with the rollers aligned axially. These axial rollers will allow the collar to rotate about the circumference of either a short stub on the end of the proximal blade section or about a shaft reaching through the core of the proximal blade section to support and rotate the distal blade section.

Another roller bearing mounted on the proximal side of these axial rollers will have additional rollers arranged as rays on a conical surface whose conical axis coincides with the axis of the collar. The conical angle (measured relative to the conical axis) will be the complement of the angle between the forward stay and the conical axis. Thus some of the conically arranged roller bearings will be approximately perpendicular to the forward stay in order to provide a stable bearing surface.

It will be appreciated that various modifications may be implemented with respect to the above described embodiments. In some alternate embodiments the wind turbine may have fewer or more than three blades. Moreover, the overall length of each blade and its sections can be varied to satisfy the desired power output, speed, efficiency, construction costs, reliability, weight, material strength, etc. Additionally, the number of stays can be increased or reduced depending upon the desired strength, rigidity, desired blade length, etc. Furthermore, the individual stays can be replaced with multiple stays that are either contiguous or spaced. Also, the distal ends of the stays can be terminated at different locations on the blades. In some embodiments multiple stays can extend from a center pylon (or central wheel) to terminate at different locations along the length of the same blade. Also, instead of terminating the proximal ends of stays on the rim of a wheel, the wheel can be replaced with a number of spokes on which stays can be terminated. Alternatively, the proximal ends of side stays can terminate directly on the blades near their roots. In addition, instead of forming loops in the stays, the stays can be terminated with other clamping devices. Moreover, the pitch of the distal blade sections can be adjusted with various types of motors (electrical stepper motors, hydraulic or pneumatic motors, etc.) located either on or near the distal blade section or closer to the axis of the wind turbine. In some cases the distal blade section may be connected to a long shaft that extends inside the proximal blade section, connecting to a driving source either in the blade or the central hub.

Obviously, many modifications and variations of the present invention are possible in light of the above teachings. It is therefore to be understood that within the scope of the appended claims, the invention may be practiced otherwise than as specifically described.

The invention claimed is:

1. A turbine blade assembly comprising:
   a central rotor having a central axis;
   a plurality of blades mounted on said rotor to rotate through a plane of rotation, each of said blades lying along a blade axis and having a proximal section and a variable pitch section, said variable pitch section being adjustable to a pitch that may differ from that of said proximal section; and
   a plurality of stays each extending from said central rotor to approach and terminate on an associated one of said blades, each of said stays having a proximal end spaced from said blades and a distal end attached to an associated one of said blades, the proximal section of each of said blades connecting to the distal ends of a different corresponding trio of said stays, for each of the blades the proximal ends of said different corresponding trio circumscribing the blade axis, each of the stays of the trio distally converging with respect to the other stays of the trio in order to reduce blade deflection front to back and along the plane of rotation.

2. A turbine blade assembly according to claim 1 wherein said trio of said stays comprises a pair whose proximal ends are at substantially diametrically opposed positions relative to said central axis.

3. A turbine blade assembly according to claim 1 wherein said trio has the proximal end of a forward one of the trio located in front of the blades and the other two of the trio have their proximal ends located at substantially diametrically opposed positions relative to said central axis.

4. A turbine blade assembly according to claim 3 wherein said central rotor comprises:
   a coaxial pylon having a distal end connected to the proximal ends of the forward one of the trio in the group of stays for each of the blades.

5. A turbine blade assembly according to claim 1 wherein the proximal section of each of said blades comprises:
   a plurality of struts each having a receptacle for engaging an affiliated one of said stays.

6. A turbine blade assembly according to claim 5 wherein the proximal section of each of said blades comprises:
   a plurality of rungs arranged polygonally with vertices adjacent to the receptacles of the struts.

7. A turbine blade assembly according to claim 6 wherein the proximal section of each of said blades comprises:
   a plurality of converging legs extending distally from the rungs.

8. A turbine blade assembly according to claim 1 wherein said rotor comprises:
   a wheel having a plurality of terminals for holding the proximal ends of at least some of the stays.

9. A turbine blade assembly according to claim 8 wherein the stays that are held on said wheel extend substantially tangentially from said wheel.

10. A turbine blade assembly according to claim 8 wherein said wheel is arranged to position said terminals behind said blades.

11. A turbine blade assembly according to claim 10 wherein said wheel has a rim with a plurality of braces that extend forwardly to reinforce said blades.

12. A turbine blade assembly according to claim 10 wherein said wheel has a hub, said blades being mounted on said hub.

13. A turbine blade assembly according to claim 1 wherein each of said blades comprises:
   a motor for rotating the variable pitch section to adjust pitch to a highest value, a lowest value, and to values in between in order to accommodate prevailing wind conditions.

14. A turbine blade assembly according to claim 13 wherein said motor has a spur gear and is located adjacent to a location between the proximal section and the variable pitch section.

15. A turbine blade assembly according to claim 1 comprising:
an electrical generator coupled to said rotor; and
a tower supporting said generator.

16. A turbine blade assembly comprising:
a central rotor having a central axis;
a plurality of blades mounted on said rotor to rotate through a plane of rotation, each of said blades lying along a blade axis; and
a plurality of stays each having a proximal end spaced from said blades and a distal end attached to an associated one of said blades, each of said blades connecting to the distal ends of a different corresponding trio of said stays, for each of the blades the proximal ends of said different corresponding trio circumscribing the blade axis, each of the stays of the trio distally converging with respect to the other stays of the trio in order to reduce blade deflection front to back and along the plane of rotation.

17. A turbine blade assembly according to claim 16 wherein said different corresponding separate pair of said stays comprises a pair whose proximal ends are at diametrically opposed positions relative to said central axis.

18. A turbine blade assembly according to claim 17 wherein one of the trio is located in front of the blades and the other two of the trio have their proximal ends located at diametrically opposed positions relative to said central axis.

19. A turbine blade assembly according to claim 18 wherein said central rotor comprises:
a coaxial pylon having a distal end connected to the proximal ends of a forward one of the trio for each of the blades.

20. A turbine blade assembly according to claim 16 wherein each of said blades comprises:
a plurality of struts each having a receptacle for engaging an affiliated one of said stays.

21. A turbine blade assembly according to claim 20 wherein each of said blades comprises:
a plurality of rungs arranged polygonally with vertices adjacent to the receptacles of the struts.

22. A turbine blade assembly according to claim 16 wherein said rotor comprises:
a wheel having a plurality of terminals for holding the proximal ends of at least some of the stays.

23. A turbine blade assembly according to claim 22 wherein said stays that are held on said wheel extend substantially tangentially from said wheel.

24. A turbine blade assembly according to claim 22 wherein said wheel is arranged to position said terminals behind said blades.

25. A turbine blade assembly according to claim 24 wherein said wheel has a rim with a plurality of braces that extend forwardly to reinforce said blades.

26. A turbine blade assembly according to claim 24 wherein said wheel has a hub, said blades being mounted on said hub.

* * * * *